W. H. GWYNNE.
APPARATUS FOR COMPRESSING GAS.

No. 29,481.    Patented Aug. 7, 1860.

Witnesses:

Inventor:

UNITED STATES PATENT OFFICE.

W. H. GWYNNE, OF NEW YORK, N. Y.

APPARATUS FOR COMPRESSING GAS.

Specification of Letters Patent No. 29,481, dated August 7, 1860.

*To all whom it may concern:*

Be it known that I, W. H. GWYNNE, of the city, county, and State of New York, have invented a new and Improved Apparatus for Compressing Gas; and I do hereby declare that the following is a full, clear, and exact description of the same, reference being had to the accompanying drawing, forming part of this specification, in which—

Figure 1:
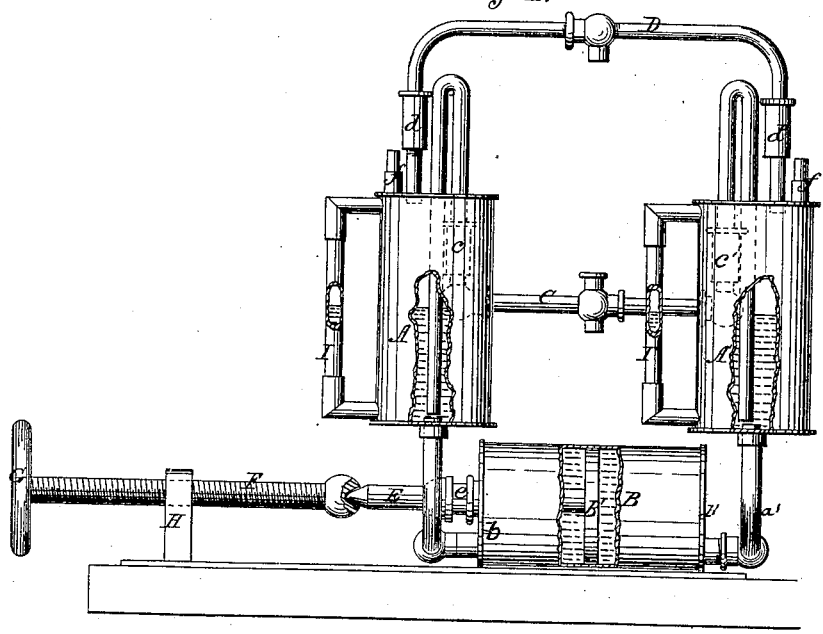
Figure 2:
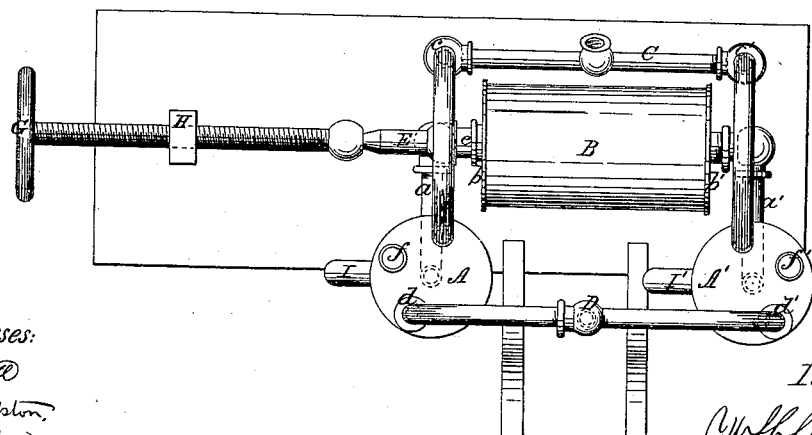

Figure 1 represents a sectional rear elevation of my invention. Fig. 2 is a plan or top view of the same.

Similar letters of reference in both views indicate corresponding parts.

The object of this invention is to compress a quantity of illuminating gas in a drum or tank so that a large quantity of gas can be carried from the place where it is manufactured, to any distance and that villages, and towns, or country seats can be supplied with gas from works situated at a great distance from the same.

My invention consists in the arrangement of two drums which are connected with each other by suitable pipes for introducing and discharging the gas, in combination with a cylinder provided with a piston in such a manner that by filling the cylinder and a portion of the drums with water and operating the piston in one direction or the other, the gas contained in one of the drums is forced out by the inflowing water while at the same time the other drum fills with gas and that by imparting to the piston a reciprocating motion, said drums alternately fill and discharge, and that the gas forced out from the drums is compressed in a suitable vessel connected with the discharge pipe.

To enable those skilled in the art to make and use my invention I will proceed to describe its construction and operation with reference to the drawing.

A, A', are two drums made of sheet iron or of any other suitable material strong enough to sustain the desired pressure. The drum A, connects by means of a pipe *a*, passing through one of the heads *b*, of the cylinder B, with the interior of this cylinder and the drum A', communicates in a similar manner by means of a pipe *a'*, with the interior of the cylinder, the pipe *a'*, passing through the opposite head *b'*, of said cylinder as clearly shown in the drawing. The drums A, A', connect with each other by means of a pipe C, through which the gas is admitted and each branch of this pipe is furnished with a check valve *c*, *c'*. These valves open inwardly so that they do not obstruct the flowing of the gas but they do prevent the gas contained in the drums from escaping through the pipe C.

D, is the discharge pipe which connects with both the drums and which serves to conduct the gas from the drums to the vessel in which it is to be compressed. Each branch of this pipe is furnished with a check valve *d*, *d'*, which opens outwardly so that the same allow the gas being forced out of the drums but prevent its returning.

The cylinder B, is provided with a piston B', which works air or water tight in the interior of said cylinder. The piston rod E, passes through a stuffing box *e*, and it connects with a screw rod F, to which a rotary motion is imparted by a hand wheel G. The connection between the piston rod E, and the screw rod F, is made in such a manner that the screw rod is allowed to turn independently of the piston rod but so that a longitudinal motion of the screw rod causes the piston rod to assume a longitudinal motion in the same direction. By these means a reciprocating motion is imparted to the piston rod B', simply by giving a rotary motion to the screw rod F, which latter is made to screw into a thread cut into the top end of a standard H.

In order to operate this apparatus, sufficient water is introduced to fill up the cylinder B, and about one half of each of the drums A, A', the height of the water in the latter being observed by glass tubes I, I', inserted into the sides of the drums. The openings *f*, *f'*, in the tops of the drums through which the water is introduced, are now closed, and gas is admitted to the drums and the piston is moved in a longitudinal direction by turning the screw rod F. If the motion of the piston takes place in the direction of the arrow marked thereon in Fig. 1, the water contained in the cylinder B, in front of the piston is forced up into the drum A', and the gas contained in this drum is forced out through the discharge pipe D. At the same time the water contained in the drum A, sinks down into the cylinder B, and this drum fills with gas. On reversing the motion of the piston the water is driven back into the drum A, and the gas contained in this drum is forced out through the discharge pipe and at the same time the water contained in the drum A', sinks down into the cylinder and this last named drum fills with gas. By repeating this operation a large quantity of gas can be compressed in suitable vessels connecting with the discharge pipe D, one vessel being removed and another put in its place whenever the pressure of the gas has attained the desired degree.

By connecting the piston to the screw rod F, the power, with which the piston can be forced in one direction or in the other, is unlimited and the gas can be compressed as much as may be desired, with little exertion.

The whole apparatus is very simple it can be constructed with little expense and when once put into proper working order, it will not easily get out of order.

It is obvious that this apparatus can be used with equal advantage for compressing carbonic-acid gas or any other gas, in all cases where it is desirable to compress a large quantity of gas in a comparatively small space.

What I claim as new, and desire to secure by Letters Patent, is—

The arrangement for the purpose of compressing gas of the drums A, A', supply pipe C, and discharge pipe D, in combination with the cylinder B, constructed and operating substantially as herein described.

W. H. GWYNNE.

Witnesses:
B. GIROUX,
M. M. LIVINGSTON.